United States Patent [19]

Pommerening

[11] 3,761,619

[45] Sept. 25, 1973

[54] DIGITAL CENTRAL SWITCHING OFFICE FOR TELEPHONE SYSTEM

[76] Inventor: Uwe A. Pommerening, 251 Raphael Dr., Webster, N.Y. 14580

[22] Filed: Mar. 10, 1972

[21] Appl. No.: 233,703

Related U.S. Application Data

[63] Continuation of Ser. No. 96, Jan. 2, 9170, abandoned.

[52] U.S. Cl......... 179/15 AT, 179/15 A, 179/15 AQ

[51] Int. Cl.............................................. H04j 3/00

[58] Field of Search...................... 179/15 A, 15 AL, 179/15 AQ, 15 AT, 15 BA, 15 BC, 15 BS, 18 ES, 18 BC, 18 J, 15 BY

[56] References Cited

UNITED STATES PATENTS

| | | | |
|---|---|---|---|
| 3,573,381 | 4/1971 | Marcus | 179/15 AQ |
| 3,549,814 | 12/1970 | Jaeger | 179/15 BY |

*Primary Examiner*—Ralph D. Blakeslee
*Attorney*—Hoffman Stone

[57] ABSTRACT

A digital switching office for a time division multiplexed, pulse code modulated signalling system. Switching is done through a matrix of gates on a space divided basis in one coordinate direction and on a combined space and time divided basis in the other coordinate direction. Each channel to be served is assigned an input highway through the matrix in one direction. Each transmitter is assigned an output highway in the other direction, and each output highway is time-shared among all the channels served by one transmitter. The matrix and all the associated central office functions are controlled by a stored program system.

4 Claims, 6 Drawing Figures

INVENTOR.
UWE A. POMMERENING
BY Hoffman Stone
ATTORNEY

PATENTED SEP 25 1973 3,761,619

SHEET 2 OF 5

INVENTOR.
UWE A. POMMERENING

INVENTOR.
UWE A. POMMERENING

INVENTOR.
UWE A. POMMERENING

INVENTOR.
UWE A. POMMERENING

DIGITAL CENTRAL SWITCHING OFFICE FOR TELEPHONE SYSTEM

This is a continuation of co-pending application Ser. No. 96, filed Jan. 2, 1970, and now abandoned.

BRIEF DESCRIPTION

This invention relates to a novel central office for a time division multiplexed, pulse code modulated signalling system, and, more particularly, to a novel central office of this kind in which all switching functions are done on a digital basis without decoding the digital signals to analog form.

Heretofore, the usual practice in the telephone industry has been to use conventional analog switching at central switching offices, and, in cases where transmission between offices is on a digital basis, to convert incoming digital signals to analog form before switching. After switching, the analog signals are converted back to digital signals if they are to leave the office over a digital line. This practice is inefficient in that the conversions introduce undesirable noise, signal attenuation and distortion, and require expensive equipment. Moreover, the analog switching equipment is relatively bulky and expensive as compared with circuitry available for handling digital signals, which is easily set up on a time-shared basis.

Accordingly, the central office equipment, according to the invention, is arranged to handle digital signals, switching them without first converting them to analog signals to provide maximum service capacity, flexibility, versatility, and full function capability with a minimum of gear.

An important feature of the invention is the central switching crosspoint matrix, which is space divided in one coordinate direction called the ING axis, and partly time divided in the output direction called the ED axis. The matrix includes a separate conductor, which for convenience is referred to herein as a highway, for each input channel to be served, and a separate output highway for each transmitter to be served. The output highways are time divided among the channels served by their respective transmitters. Switch connections are effected through gates, one of which is connected at each crosspoint in the matrix. The gates are selectively enabled and inhibited under control of a stored program system, analogous to the common control used in analog switching offices, which also correlates all other functions of the central office such as channel scanning, supervision and marking, timing of the tone generators, and operation of auxiliary services such as camping, call forwarding, and repertoire dialing.

DETAILED DESCRIPTION

Figure 1:
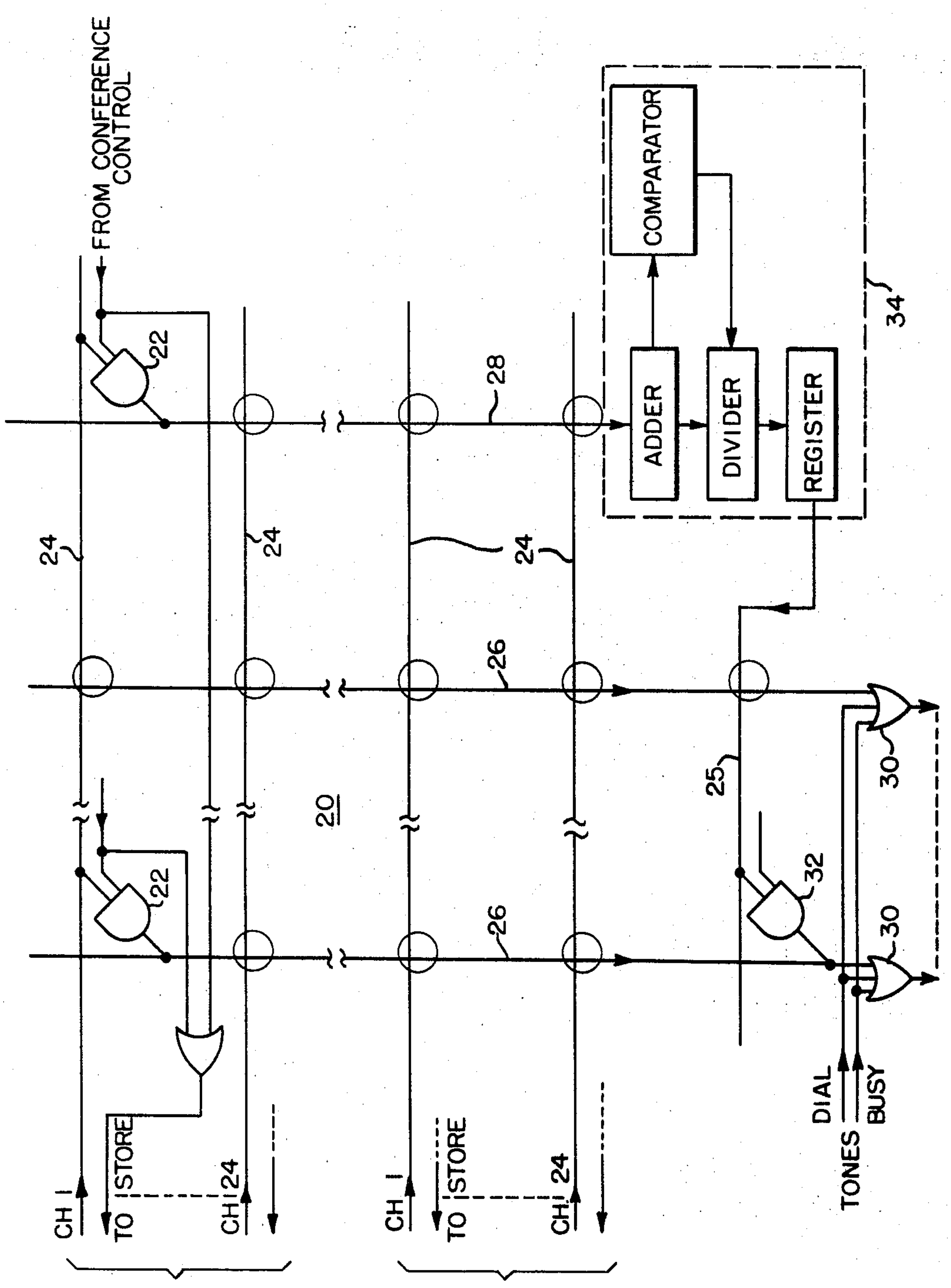
Figures 2, 6:
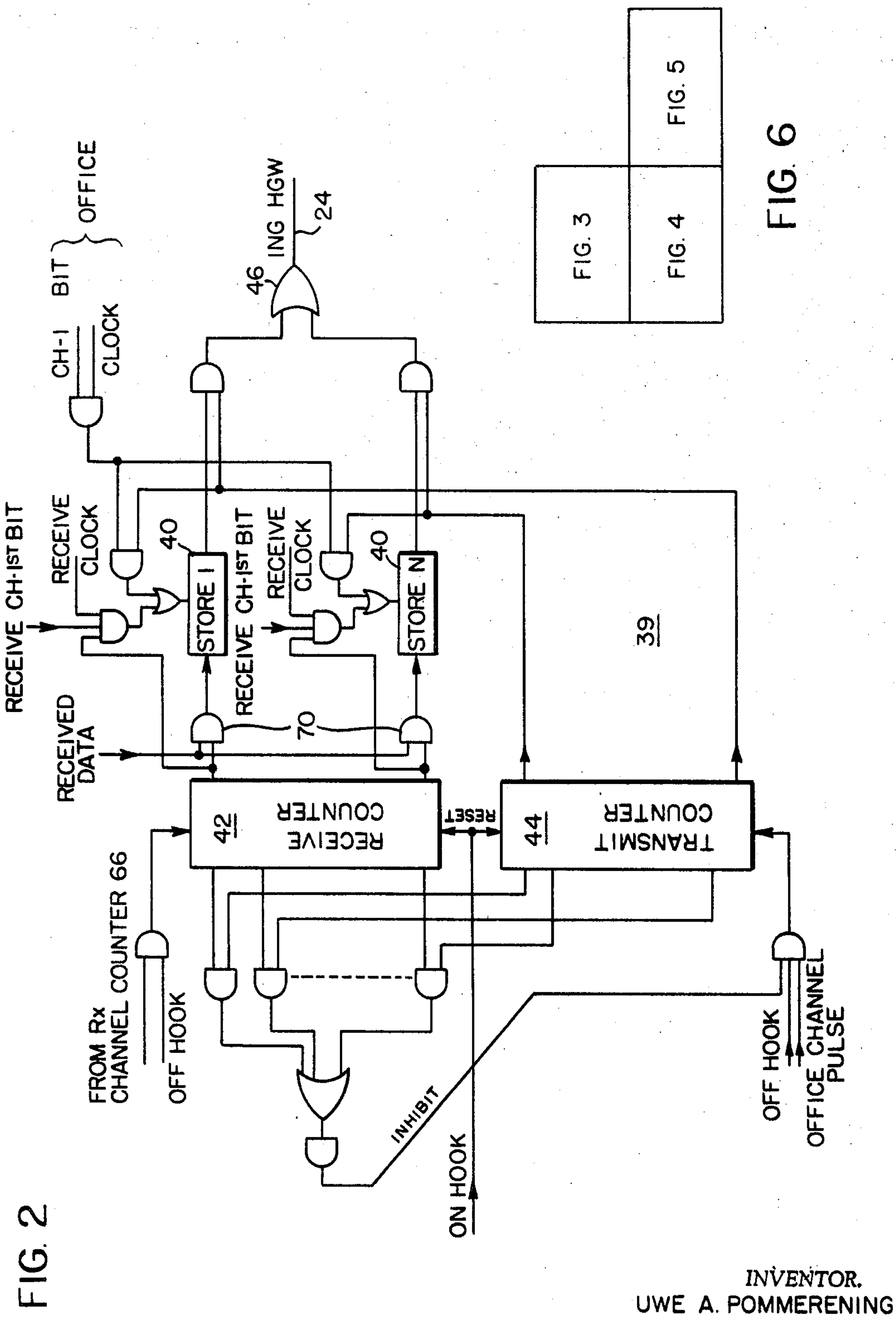
Figure 3:
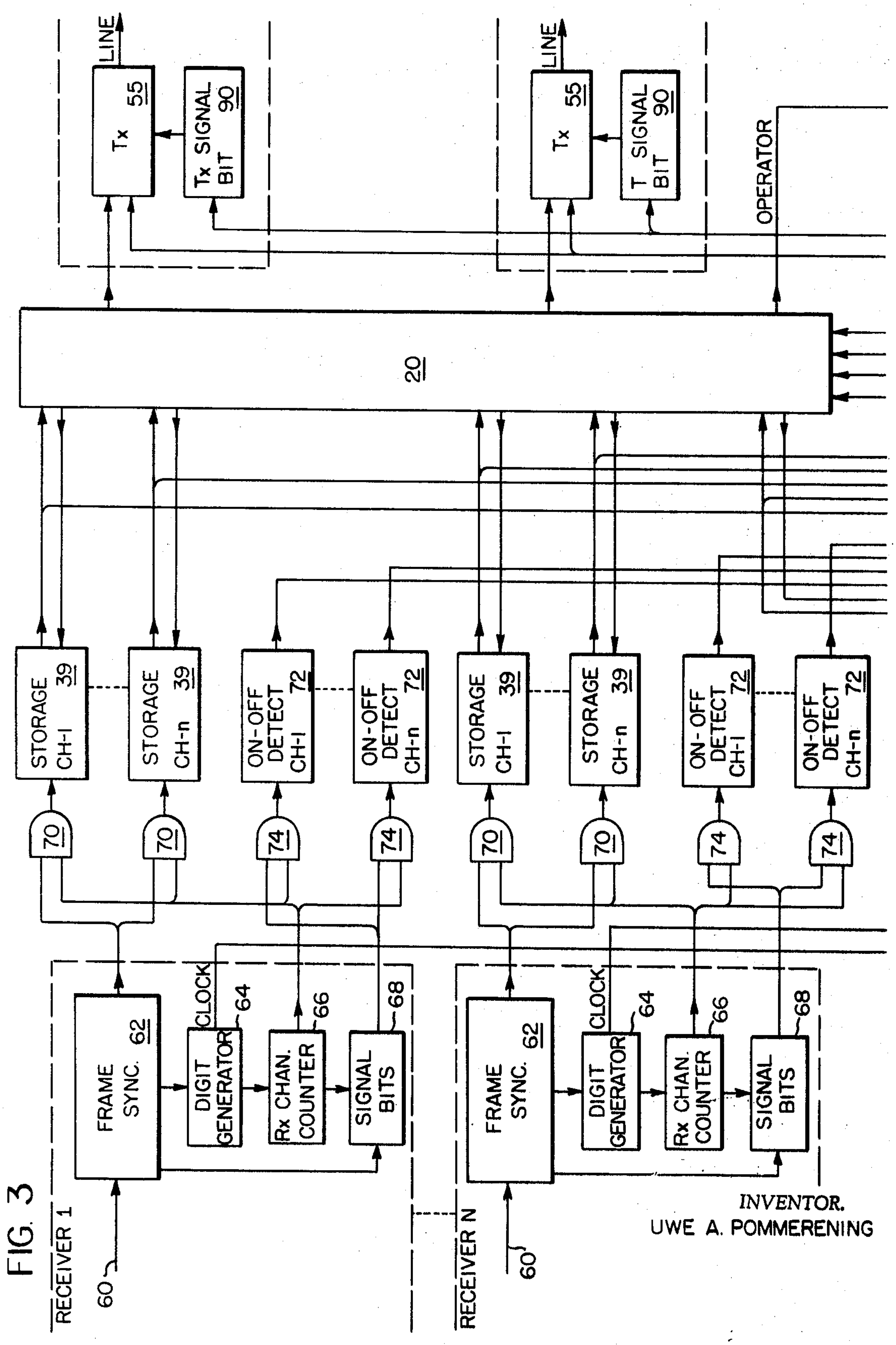
Figure 4:
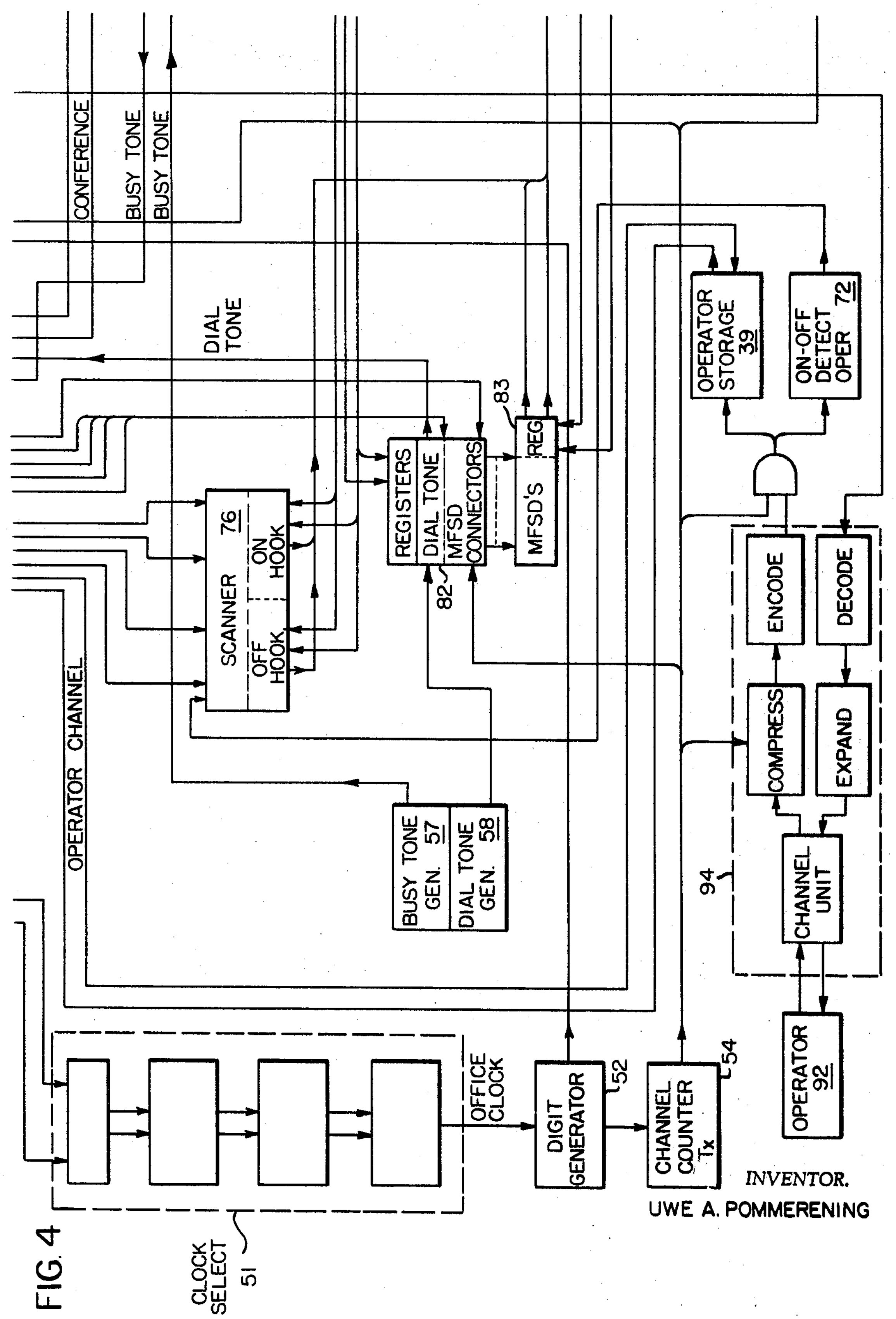
Figure 5:
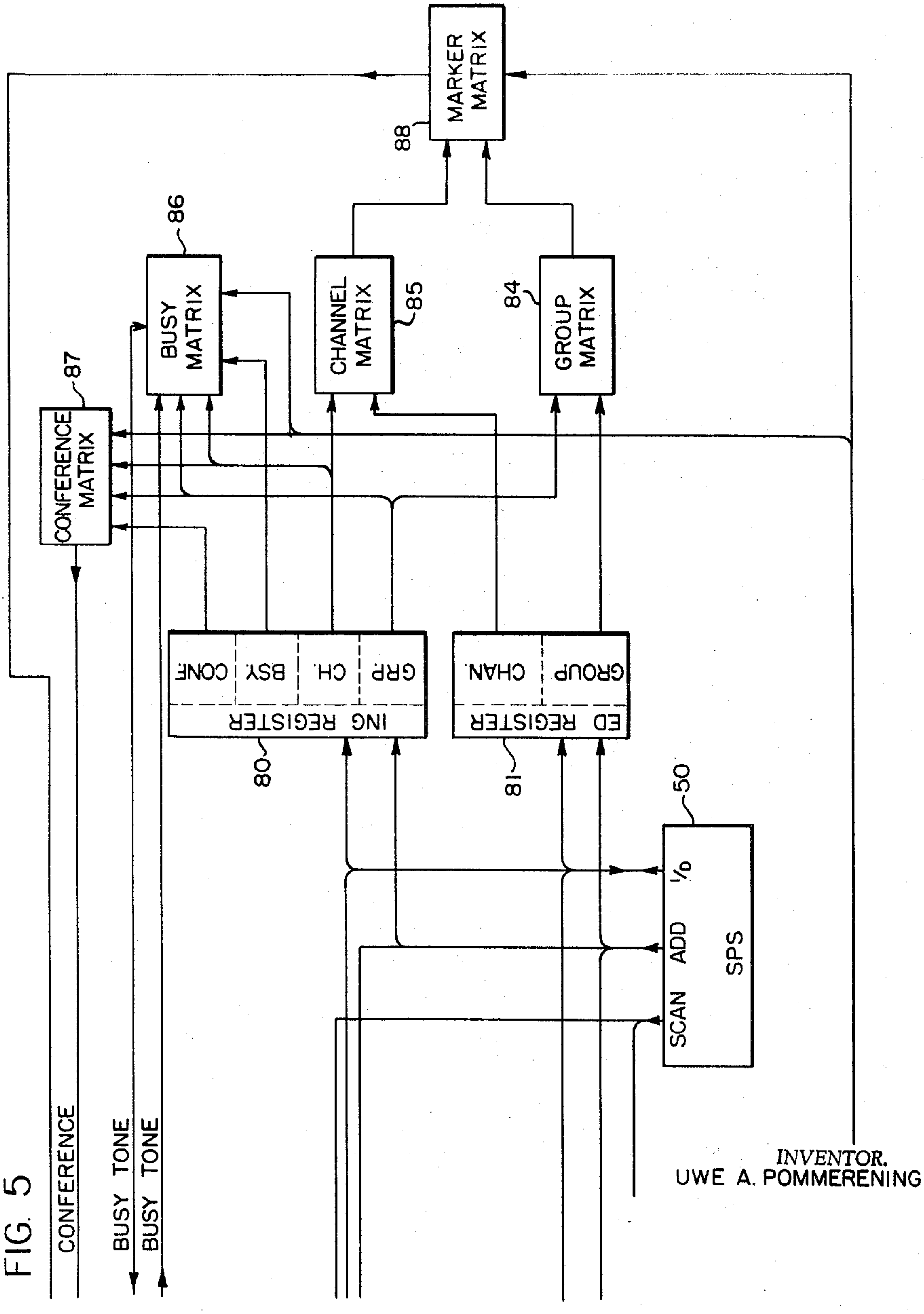

A representative embodiment of the invention will now be described in detail in connection with the accompanying drawings, wherein: FIG. 1 is a schematic diagram of a central office switching matrix according to the invention;

FIG. 2 is a schematic diagram of a signal input arrangement for feeding signals into the matrix shown in FIG. 1, and including gates and stores for holding input signals pending their assignment to outgoing channels;

FIGS. 3–5, when arranged as indicated in FIG. 6, constitute a block diagram of a complete digital central switching office according to the invention; and FIG. 6 is a chart showing the correlation of FIGS. 3–5.

Reference is made to companion applications filed concurrently herewith and assigned to the present assignee, which describe in greater detail certain portions of the present circuit that are indicated in FIGS. 3–5 in block form only. Detailed descriptions of these portions are not essential to an understanding of the invention, and they will be described only sketchily herein on a functional basis. If further details are desired, reference may be had to the respective applications, all of which are by the present applicant:

"Synchronization of Clocks in Digital Signalling Networks," Serial No. 97.

"Digital Conference Circuit for PCM Signalling System," Serial No. 98.

"Synthesis of Digital Signals Corresponding to Selected Analog Signals," Serial No. 4.

In addition, a stored program system of the kind readily adaptable for use in the central office described herein is described and claimed in a pending application of William F. Bartlett, John C. Gifford, Pedro A. Lenk, William A. Oswald, Frank Y. Shaw, Theodore D. Stuebe, and Lloyd H. Yost, filed Nov. 26, 1969, Ser. No. 880,110, entitled, "Stored Program System," and also assigned to the present assignee.

Referring now to the drawings, the heat of the central switching office is a matrix 20 of gates 22 connected between respective ING highways 24 and ED highways 26. There is one ING highway for each channel to be served and one ED highway for each transmitter. The ED highways are time-shared according to the number of channels handled by the respective transmitters. The ING highways outnumber the the ED highways by a factor equal to the number of channels per transmitter. Signal transmission is in one direction only, from the left as viewed in FIG. 1 to a crosspoint and then down. One or more auxiliary ED channels 28 are included to provide conference service.

Signals enter the matrix 20 along an ING highway, pass through one of the crosspoint gates 22 to one of the ED highways 26 and 28, and thence through one of the OR gates 30 to one of the transmitters 32 (FIG. 5). The OR gates 30 isolate the signals in the matrix 20 from dial tone and busy tone signals, which are fed directly to the OR gates 30, and are not switched through the matrix 20.

Conference calls are set up through the auxiliary ED highway 28 and a level compensating circuit 34, the output of which is fed to one or more of the main ED highways 26 through an auxiliary ING highway 25 and gates 32. The level compensating circuit 34 operates to adjust the values of the signals transmitted to conference participants to levels within the channel capacity, thereby to avoid clipping and the resulting signal distortion. The compensating circuit 34 is preferably arranged as described and claimed in my hereinabove identified, concurrently filed application, Ser. No. 98.

FIG. 2 shows an input storage circuit 39, one of which is included for each channel, for feeding data into one of the ING highways of the matrix 20. The circuit as shown is arranged to provide buffer storage to accommodate differences in rate among the various different clocks in the network, to accommodate differences in phase of the framing of the receiver channels and the local transmitters, and to hold signals pending their assignment to outgoing channels. Each one of the stores 40 indicated is arranged to store one data word, seven bits in the typical case. Successive words from the selected channel are put into respective ones of the stores 40 under control of a RECEIVE counter 42. They are removed from the stores 40 in proper order under control of the local office clock and a TRANSMIT counter 44. Enough stores 40 are included for each channel to accommodate rate differences for a predetermined period without loss of information, as calculated on the basis of the accuracy of the clocks in the network. When the input data start to overlap the output, an inhibit signal is developed in the RECEIVE counter 42 to block the TRANSMIT counter 44 for one frame, causing loss of information and restoring all of the stores 40 for a new start. The outputs of the stores 40 are fed through an OR gate 46 to the ING highway 24 assigned to the particular channel.

In accordance with the invention as described and claimed in my hereinabove identified, concurrently filed application Ser. No. 97, all central offices in the network are arranged to seek and select the slowest clock available to them for synchronizing purposes, in which case the entire network quickly becomes synchronized by the same clock — the slowest one in the network. If the central offices are so equipped to seek the slowest clock available to them, then only two buffer stores 40 are required for each channel to allow for phase differences in framing and proper transmitter channel assignment.

The overall electrical layout of a typical centrai office according to the invention is shown in FIGS. 3—5, which, when arranged as indicated in FIG. 6, form a complete schematic block diagram.

The matrix 20 is the switching heart of the office. All timing functions are controlled by the stored program system 50. A clock selection circuit 51 (FIG. 4) selects the office clock from among all the clock signals available at the office to synchronize the digit generator 52, which times all the operations of the office and drives the channel counter 54. The outputs of the digit generator 52 and the channel counter 54 are connected to all of the transmitters 55 (FIG. 3) for synchronizing them.

Tone generators such as the busy and dial tone generators 56 and 58 shown, are preferably of the type described and claimed in my hereinabove identified application, Ser. No. 4.

The incoming PCM lines 60 at the office are connected separately to respective frame synchronizing circuits 62, the outputs of which drive respective digit generators 64 to generate clock signals for the respective receivers. Th digit generators 64 drive respective channel counters 66, which separate the various time-spaced channels of the incoming signals, and also deliver the signals indicating the conditions of the subscribers' hook-switches to SIGNAL BITS circuits 68.

The outputs of the digit generators 64 are fed to the clock selection circuit 51. The outputs of the frame synchronizing circuits 62 and the channel counters 66 are arranged to separate the incoming signals according to their respective channels, and to feed them to respective ones of the storage circuits 39, by selectively enabling and inhibiting data input gates 70. The outputs of the channel counters 66 are also connected with the outputs of the SIGNAL BITS circuits 68 to drive on-off hook detectors 72 through signalling input gates 74.

Only one each of the frame synchronizers 62, digit generators 64, channel counters 66, and SIGNAL BIT circuits 68 are required for each incoming line 60. Downstream from these units, the arrangement is space-divided by channels to feed into the ING highways 24 of the switching matrix.

A separate detector 72 is provided to detect changes in supervisory signals in each channel. A scanner 76 scans the detectors 72 and signals the stored program system 50 when a change is noted. The stored program system then sets ING and ED registers 80 and 81, and dial tone and signal detecting registers 82 and 83, respectively, to effect the required services.

Signalling for desired called line designation may be on any desired basis such as regular dial, single frequency, or the multi-frequency signalling indicated in FIG. 4. It is within the skill of the art to provide additional registers, detectors, and selector circuits to allow the office to accept and respond to signals of all types.

The outputs of the ING and ED registers 80 and 81 are fed through auxiliary group, channel, busy, conference, and marker matrices 84, 85, 86, 87, and 88, respectively, selectively to inhibit and enable various different ones of the gates 22 and 32 in the matrix 20 at the proper times.

The received signals are fed into the storage circuits 39 as they arrive under control of the channel counters 66. They are fed from the storage circuits 39 through the matrix 20 in accordance with the transmitter channel assignment, as controlled by the stored program system 50 through the ING and ED registers 80 and 81 and the auxiliary matrices 84–88. The signalling bits are not passed through the main matrix 20, but are regenerated by the local channel counter 54 in accordance with the local office frame timing, and gated into the transmitter lines through TRANSMIT SIGNALLING circuits 90.

An operator's position 92 is connected ao a separate input channel into the main matrix 20 through a conventional interface circuit 94 and separate ones of the storage circuits 39 and on-off hook detectors 72.

What is claimed is:

1. A central switching office for selectively switching time division multiplexed, pulse code modulated signals from a plurality of input channels to selected ones of a plurality of output channels comprising:

a. a separate store for each of the input channels,
b. means for feeding signals from the respective input channels into said stores as they are received at the office,
c. a two-coordinate matrix of conductors including ING conductors extending in a first direction, one for each of said stores, and ED conductors crossing all of said ING conductors, one for each group of a predetermined number of output channels, and digital gates connecting the ING and ED conductors at each crosspoint of said matrix,
d. pulse code modulated transmitters, one connected to each of said ED conductors, for receiving signals from said ED conductors, and
e. control means for selectively enabling and inhibiting said gates and triggering said stores in timed sequence to transmit signals from said stores to said transmitters, said control means enabling said gates and triggering said stores in accordance with the timing of the output channels assigning the input channels separately and individually to respective ones of said ING conductors, and multiplexing several channels on each ED conductor.

2. A central switching office for selectively switching time division multiplexed, pulse code modulated signals from a plurality of input channels to selected ones of a plurality of output channels, each channel having a predetermined number of signal intervals for transmitting data signals and one signal interval for transmitting supervisory signals, said office comprising:

a. a separate store for each of the input channels, b. means for feeding data signals from the respective input channels into said stores as they are received at the office, c. a two-coordinate matrix of conductors including ING conductors extending in a first direction, one for each of said stores, and ED conductors crossing all of said ING conductors, one for each group of a predetermined number of output channels, and digital gates connecting the ING and ED conductors at each crosspoint of said matrix, d. pulse code modulated transmitters, one connected to each of said ED conductors, for receiving signals from said ED conductors, e. control means for selectively enabling and inhibiting said gates and triggering said stores in timed sequence to transmit signals from said stores to said transmitters, said control means enabling said gates and triggering said stores in accordance with the timing of the output channels assigning the input channels separately and individually to respective ones of said ING conductors, and multiplexing several channels on each ED conductor.

f. supervisory detectors, one for each channel, for receiving the supervisory signals and producing output signals in response to predetermined changes in the supervisory signals, g. means for blocking supervisory signals from said matrix and for applying them to said detectors, and h. said control means including means responsive to said detectors for applying supervisory signals to said transmitters in proper sequence relative to the data signals applied through said matrix.

3. A central switching office for selectively switching time division multiplexed, pulse code modulated signals from a plurality of input channels to selected ones of a plurality of output channels comprising:

a. space divided stores, one for each of the input channels, b. means for feeding signals from the respective input channels into said stores as they are received at the office, c. a two-coordinate matrix of conductors including ING conductors extending in a first direction, one for each of said stores, ED conductors crossing all of said ING conductors, one for each group of a predetermined number of output channels, and digital gates connecting the ING and ED conductors at each crosspoint of said matrix, said matrix including also an auxiliary ED conductor crossing all of said ING conductors, a conference level compensating circuit terminating said auxiliary ED conductor, an auxiliary ING conductor from the output of said compensating circuit crossing all of the first mentioned ED conductors, and digital gates connecting said auxiliary ED and ING conductors to the first said ING and ED conductors at each crosspoint formed by said auxiliary ED and ING conductors, respectively, d. pulse code modulated transmitters, one connected to each of the first said ED conductors, for receiving signals from them, and e. control means for selectively enabling and inhibiting said gates in timed sequence to transmit signals from said stores to said transmitters, signals for conference calls being routed over said auxiliary ED and ING conductors, said control means enabling said gates and triggering said stores in accordance with the timing of the output channels assigning the input channels separately and individually to respective ones of said ING conductors, and multiplexing several channels on each ED conductor.

4. A central switching office for selectively switching time division multiplexed, pulse code modulated signals from a plurality of input channels to selected ones of a plurality of output chanels, each channel having a predetermined number of signal intervals for transmitting data signals and one signal interval for transmitting supervisory signals, said office comprising:

a. space divided stores, one for each of the input channels, b. means for feeding data signals from the respective input channels into said stores as they are received at the office, c. a two-coordinate matrix of conductors including ING conductors extending in a first direction, one for each of said stores, and ED conductors crossing all of said ING conductors, one for each group of a predetermined number of output channels, and gates connecting the ING and ED conductors at each crosspoint of said matrix, d. pulse code modulated transmitters, one connected to each of said ED conductors, for receiving signals from said ED conductors, e. control means for selectively enabling and inhibiting said gates in timed sequence to transmit signals from said stores to said transmitters, f. means for generating clock signals responsively to signals received at the office indicating the time rate of all received signals, g. means for generating a local clock signal independently of all the received signals, h. means for selecting the slowest of all the clock signals produced by both said generating means, and i. means for producing timing signals in response to the clock signal selected by said selecting means for timing the operation of all of said transmitters.

* * * * *